US010245649B2

United States Patent
Mies et al.

(10) Patent No.: US 10,245,649 B2
(45) Date of Patent: Apr. 2, 2019

(54) WORKPIECE CLAMPING SYSTEM FOR A MEASURING MACHINE

(71) Applicant: Klingelnberg AG, Zurich (CH)

(72) Inventors: Georg Mies, Wipperfuerth (DE); Rainer Engels, Wermelskirchen (DE)

(73) Assignee: KLINGELNBERG AG, Zurich (CH)

( * ) Notice: Subject to any disclaimer, the term of this patent is extended or adjusted under 35 U.S.C. 154(b) by 0 days.

(21) Appl. No.: 15/432,836

(22) Filed: Feb. 14, 2017

(65) Prior Publication Data
US 2017/0234668 A1    Aug. 17, 2017

(30) Foreign Application Priority Data

Feb. 15, 2016 (DE) .................... 20 2016 100 766 U

(51) Int. Cl.
*B23B 31/163* (2006.01)
*B23B 31/16* (2006.01)
(Continued)

(52) U.S. Cl.
CPC ...... *B23B 31/16033* (2013.01); *B23B 31/102* (2013.01); *B23B 31/16291* (2013.01);
(Continued)

(58) Field of Classification Search
CPC ............ B23B 31/102; B23B 31/16075; B23B 31/16112; B23B 31/1615;
(Continued)

(56) References Cited

U.S. PATENT DOCUMENTS

| 1,446,065 A | * | 2/1923 | Pratt | ................. B23B 31/16275 |
|---|---|---|---|---|
| | | | | 279/118 |
| 2,308,493 A | * | 1/1943 | De Rentiis | ............... G04D 3/04 |
| | | | | 269/14 |

(Continued)

FOREIGN PATENT DOCUMENTS

| CN | 202101657 U | 1/2012 |
|---|---|---|
| CN | 203003169 U | 6/2013 |

(Continued)

OTHER PUBLICATIONS

Search Report from priority application DE 20 2016 100 766.6 dated Nov. 17, 2016 by the German Patent & Trademark Report, partial machine translation provided.

(Continued)

*Primary Examiner* — Eric A Gates
(74) *Attorney, Agent, or Firm* — Hassan Abbas Shakir; Shakir Law PLLC

(57) ABSTRACT

A workpiece clamping system for a measuring machine includes a rotary table disposed in a workpiece rotation axis and includes a chuck for the concentric accommodation of a workpiece, a rotary drive for the rotary table, an upper centering tip mountable or mounted on the measuring machine in the workpiece rotation axis vertically opposed to the rotary table, and a lower centering tip mountable or mounted on the rotary table in addition to the chuck for accommodating a workpiece between the centering tips instead of in the chuck, wherein the lower centering tip is provided and formed to be concentrically clamped in the chuck instead of a workpiece, and in that the workpiece clamping system is provided with a conveying device for vertically or vertically and horizontally conveying the lower centering tip into and from its clamping position in the chuck.

8 Claims, 13 Drawing Sheets

Figure 1:
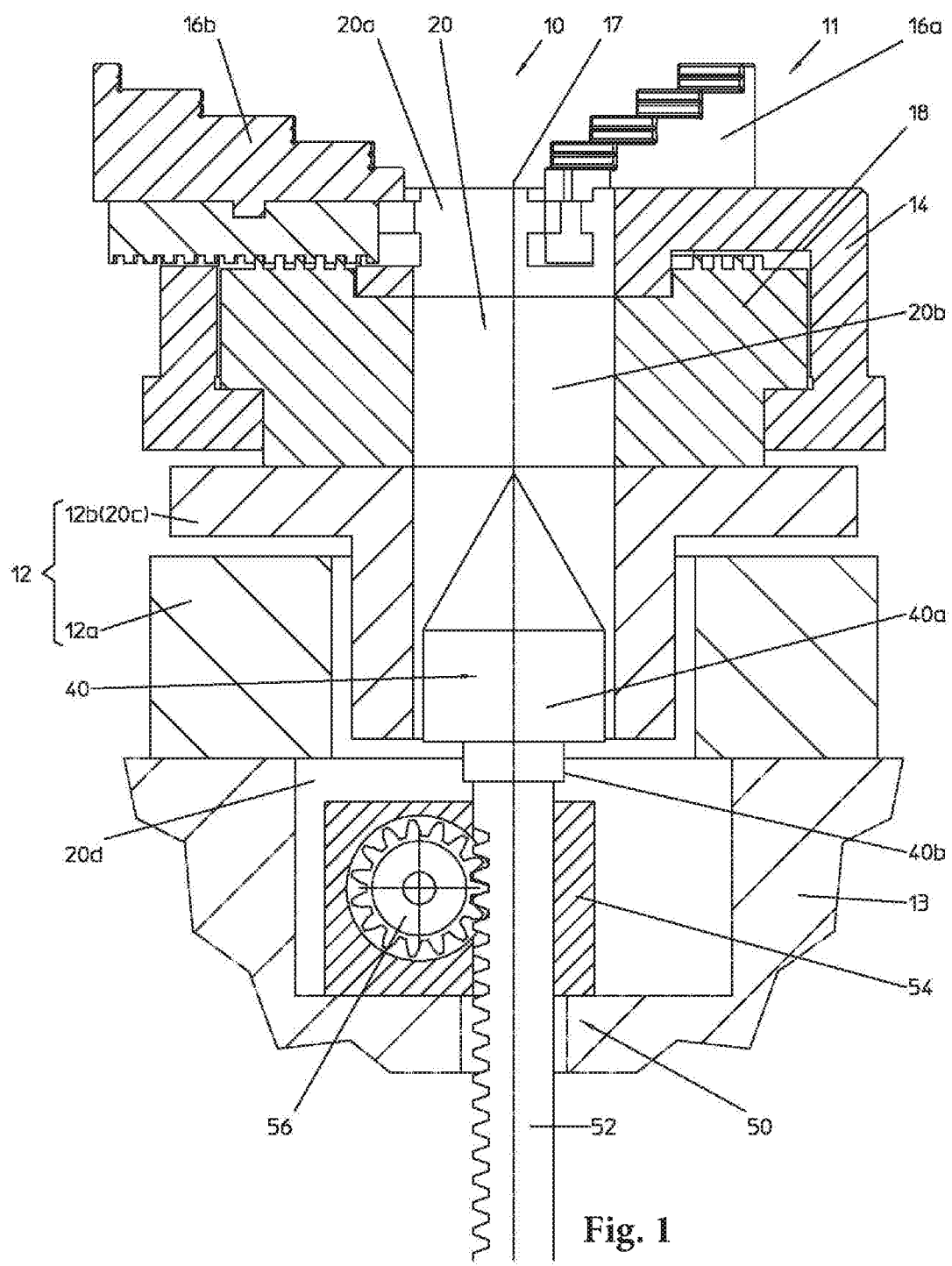
Figure 2:
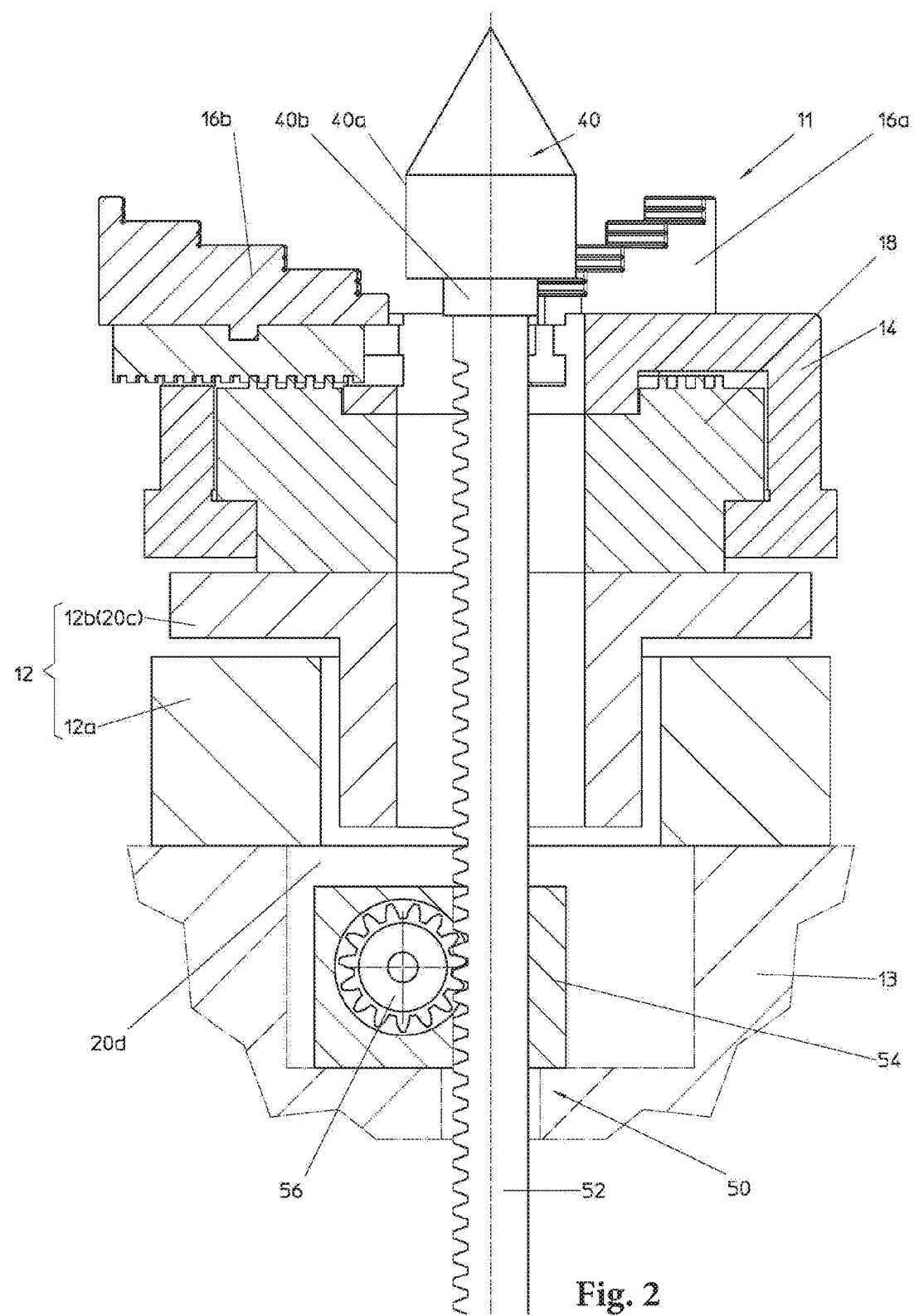

(51) Int. Cl.
*B23B 31/10* (2006.01)
*G01B 5/00* (2006.01)

(52) U.S. Cl.
CPC ......... *G01B 5/0002* (2013.01); *G01B 5/0004* (2013.01); *B23B 2260/062* (2013.01); *B23B 2270/022* (2013.01); *Y10T 279/14* (2015.01); *Y10T 279/19* (2015.01); *Y10T 279/1926* (2015.01); *Y10T 279/26* (2015.01); *Y10T 279/29* (2015.01)

(58) Field of Classification Search
CPC ........ B23B 31/16187; B23B 31/16225; B23B 31/16262; B23B 31/16291; B23B 31/16033; B23B 2270/022; G01B 5/004; Y10T 279/14; Y10T 279/26; Y10T 279/29
See application file for complete search history.

(56) References Cited

U.S. PATENT DOCUMENTS

| | | | | |
|---|---|---|---|---|
| 2,625,845 A | * | 1/1953 | Thelning | B23B 31/06 279/103 |
| 2,793,865 A | * | 5/1957 | Staples | B23F 23/06 279/133 |
| 2,948,540 A | * | 8/1960 | Garberding | B23B 31/16187 279/121 |
| 3,023,677 A | * | 3/1962 | Charlat | B23B 39/205 279/76 |
| 3,076,662 A | * | 2/1963 | Kostyrka | B23B 31/16287 279/126 |
| 3,420,538 A | * | 1/1969 | Milton | B23B 31/19 279/106 |
| 3,858,893 A | * | 1/1975 | Ovanin | B23B 31/16225 279/119 |
| 4,604,923 A | * | 8/1986 | Link | B23B 3/161 279/133 |
| 4,616,538 A | * | 10/1986 | Hessbruggen | B23B 31/16262 279/121 |
| 5,074,177 A | * | 12/1991 | Schmidt | B23B 31/16033 82/165 |
| 5,303,939 A | * | 4/1994 | Akashi | B23B 31/18 279/128 |
| 6,637,307 B2 | * | 10/2003 | Bohler | B23B 23/00 82/165 |
| 7,424,776 B2 | * | 9/2008 | Shoji | B23B 5/18 279/106 |
| 8,205,531 B2 | * | 6/2012 | Wu | B23B 23/02 82/157 |
| 2005/0204571 A1 | | 9/2005 | Mies et al. | |
| 2013/0193654 A1 | | 8/2013 | Taglang | |
| 2015/0352641 A1 | | 12/2015 | Mies | |

FOREIGN PATENT DOCUMENTS

| | | | | |
|---|---|---|---|---|
| CN | 103196386 A | | 7/2013 | |
| CN | 103240432 A | | 8/2013 | |
| CN | 103453848 A | | 12/2013 | |
| CN | 204128509 U | | 1/2015 | |
| DE | 817670 C | * | 10/1951 | ....... B23B 31/16033 |
| DE | 3620260 A1 | * | 1/1987 | ....... B23B 31/16033 |
| DE | 10 2012 100 821 A1 | | 8/2013 | |
| DE | 20 2014 004 713 U1 | | 5/2015 | |
| DE | 20 2014 103 792 U1 | | 12/2015 | |
| EP | 1190794 A1 | | 3/2002 | |
| JP | 2008246632 A | * | 10/2008 | ............. B23B 31/36 |

OTHER PUBLICATIONS

Non-patent literature Klingelnberg P26/P40 Präzisionsmesszentren comprising the publication information "DE May 2013", cited in the specification, English version attached.

Office Action dated Dec. 5, 2017 by the Japanese Patent Office in related Japanese patent application 2017-021067, partial translation provided.

Office Action and Search Report in related Chinese patent application 20170079553.4 issued by the State Intellectual Property Office of China, dated Aug. 13, 2018, translation provided.

* cited by examiner

WORKPIECE CLAMPING SYSTEM FOR A MEASURING MACHINE

BACKGROUND OF THE INVENTION

1. Field of the Invention

The invention relates to a workpiece clamping system for a measuring machine comprising a rotary table disposed in a workpiece rotation axis and comprising a chuck for the concentric accommodation of a workpiece, a rotary drive for the rotary table, an upper centering tip mountable or mounted on the measuring machine in the workpiece rotation axis vertically opposed to the rotary table and a lower centering tip for accommodating a workpiece between the centering tips instead of in the chuck mountable or mounted on the rotary table in addition to the chuck.

2. Discussion of the Related Art

A measuring machine in which a workpiece clamping system of the abovementioned type is used can be found, for example, in the company's catalogue "KLINGELNBERG P26/P40 Präzisionsmesszentren" comprising the publication information "DE 05/2013". A measuring machine as shown in the appended drawings in FIG. 13 as the state of the art is, according to the description on page 4 of the company's catalogue, a precision measurement centre in which the measuring machine comprises a precision heavy-duty rotary table. It is embodied as a measuring axis (C axis) and concentrically accommodates workpieces to be examined in a workpiece rotation axis designated by 17 in the appended FIG. 13. In combination with three linear measuring axes, tangential (X-axis), radial (Y-axis), and vertical (Z-axis), illustrated in the figure on page 4 of the company's catalogue the measuring machine scans functional surfaces of indentations and generally driving components in the manufacturer mode and examines them with the highest measuring and reproduction precision.

In the Applicant's current P production series which is among the precision measurement centres P26 and P40 according to the abovementioned company catalogue, there are the options of clamping between tips (illustrated in the company's catalogue on page 4), the accommodation in the chuck (illustrated in the company's catalogue on page 12, image on the left in the second last row of images) or the direct placement of the workpiece on the rotary table (which is of no relevance here) for accommodating the workpieces. In a measuring machine as partly visible in the abovementioned left image on page 12 of the company's catalogue no upper centering tip is provided as a backing device so that clamping between the tips is inapplicable with this machine. In the machine according to page 12 of the company's catalogue, it is therefore envisaged that the workpieces to be measured are accommodated in a clamping system comprising a multi-jaw chuck.

Figure 13:
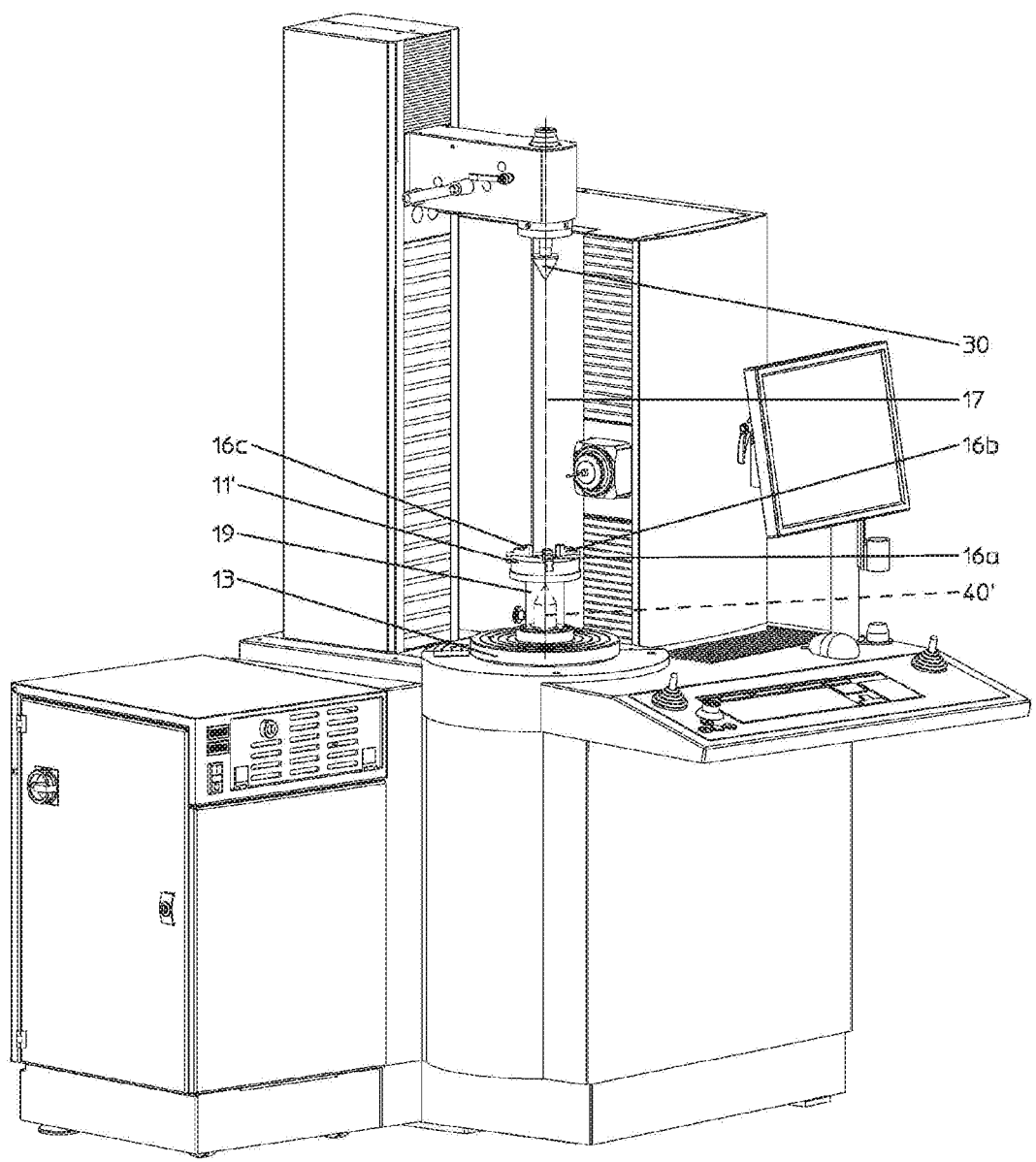

In the illustration in the appended FIG. 13 corresponding to the illustration on page 4 of the company's catalogue an additional chuck 11' in which short, symmetric workpieces are clamped is mounted on a rotary table 13. A lower centering tip 40' indicated by dotted lines in FIG. 13 may also be concentrically mounted on the rotary table 13 in a column 19 concentrically mounted on the rotary table 13 and supporting the chuck 11'. If a workpiece is to be clamped between the upper centering tip 30 and the lower centering tip 40' instead of in the chuck 11' the measuring machine has to be converted in advance which consumes time. The conversion includes the removal of the chuck 11' and the column 20 supporting the chuck 11' so that the lower centering tip 40' is made accessible or can be fixed on the rotary table 13. The latter case corresponds to the alternative that the lower centering tip 40' is not accommodated in the column 19 but kept separately and only mounted on the rotary table 13 after the removal of the chuck 11' and the column 19. In this case the conversion will cost even more time.

Such measuring machines are generally used in assembly lines as employed in automobile and utility vehicle industry as well as in aircraft industry. If different parts are to be produced in an assembly line the conversion of the measuring machine should be possible and automatable with less time expenditure. In addition, the solution comprising a lower centering tip disposed in a column under a chuck 11' and to be made accessible only by the removal of the column and the chuck is not flexible.

SUMMARY OF THE INVENTION

It is the object the invention to make switching between two clamping types in a workpiece clamping system of the above-mentioned type more flexible and less time-consuming.

Proceeding from a workpiece clamping system the above-mentioned type, said object is, according to the invention, solved by the lower centering tip being provided and designed to be concentrically clamped in the chuck instead of a workpiece and by the workpiece clamping system being provided with a conveying device for vertically or vertically and horizontally conveying the lower centering tip into its and from its clamping position in the chuck. The workpiece clamping system according to the invention particularly provides for the advantage that the measuring machine can be readily switched between clamping in the chuck and clamping between tips. This is achieved by leaving the chuck on the measuring machine and by conveying the lower centering tip into the chuck by means of a conveying device so that it is clamped there, or by conveying the lower centering tip previously clamped in the chuck out of the chuck. In contrast to converting a machine by removing the chuck and the column supporting the chuck, or by installing the chuck and the column supporting the chuck the workpiece clamping system according to the invention which can be simply changed over to another clamping type without being retrofit is well suited for a time-saving automation of a clamping type change in a measuring machine used in an assembly line.

The chuck used for the workpiece clamping system according to the invention may be a multi-jaw chuck as known, for example, from the Applicant's utility model DE 20 2014 004 713 U1. There, the multi-jaw chuck is part of a clamping system for a workpiece on a measuring machine. To ensure a simplified handling of such a clamping system and to cover a wider bandwidth of clamping situations no manually operable multi-jaw chuck is used in this known clamping system. Rather, the clamping system is motor-driven, namely by the electric rotary drive of the multi-jaw chuck. The use of such a multi-jaw chuck which is motor-operated, namely by the electric rotary drive of the multi-jaw chuck, reduces the time expenditure required for clamping the workpiece to be measured and increases the flexibility of the measuring machine of the workpiece clamping system according to the present invention. This in turn enables a simple automation of a clamping type change in the workpiece clamping system according to the invention. In the known clamping system a part of the clamping system is fixed with the aid of a coupling during a clamping or release process so that the rotary drive of the multi-jaw chuck assumes the function of the clamping jaw adjustment. The torque of the C-axis rotary drive can be controlled with high precision. Through this torque control a force control of the workpiece clamp is possible. The direct coupling of the C-axis rotary drive to the C-axis is maintained during the deployment of this known clamping system and is also an economically attractive solution for the present invention.

In one embodiment of the workpiece clamping system according to the invention the rotary table and/or the rotary drive of the rotary table comprise(s) at least one segment of a hollow shaft in which the lower centering tip is vertically conveyable along the workpiece rotation axis by means of the conveying device. In this way, converting the workpiece clamping system according to the invention from one clamping type to the other clamping type is substantially facilitated. Namely, the lower centering tip only has to be conveyed out of the hollow shaft into the chuck so that it can be clamped therein, or, if the workpiece clamping system is to be used for clamping a workpiece in the chuck, simply be fed from the chuck into the hollow shaft.

In a further embodiment of the workpiece clamping system according to the invention the conveying device comprises a rod which is disposed in the hollow shaft and can be moved up and down between an non-operating position and the clamping position of the lower centering tip inside the hollow shaft for vertically conveying the lower centering tip along the workpiece rotation axis. This is a particularly simple and useful possibility for conveying the lower centering tip into and out of the chuck.

In a further embodiment of the workpiece clamping system according to the invention the rod can be reciprocated along the workpiece rotation axis with the aid of an actuator. This embodiment is particularly suitable if no drive suitable for conveying the lower centering tip along the workpiece rotation axis exists under the chuck. When switching the clamping type, this embodiment gives rise to a further facilitation if, in combination with the chuck, clamping in the chuck or between centering tips depending on the component to be accommodated (workpiece or lower centering tip) is to be realised without converting the measuring machine.

In a further embodiment of the workpiece clamping system according to the invention the rod is a rack which can be reciprocated by means of a pinion drivable by the actuator. The drive for the conveying device could also be implemented in another way, for example, by means of a threaded spindle or a linear motor or with the aid of an electric, pneumatic or hydraulic cylinder. The latter options, however, require more expenditure since in these cases the required energy has to be specifically supplied or generated.

In a further embodiment of the workpiece clamping system according to the invention the conveying device comprises conveying equipment for conveying the lower centering tip transversely relative to the workpiece rotation axis and along the workpiece rotation axis. This embodiment is particularly advantageous if a robot can be used as the conveying equipment within the scope of an assembly line. Conveying will then be effected transversely relative to the workpiece rotation axis, and then along the workpiece rotation axis, or vice versa.

In a further embodiment of the workpiece clamping system according to the invention the chuck is formed as a multi-jaw chuck. It was already mentioned above that for this purpose a motor-operated multi-jaw chuck as known from the Applicant's utility model DE 20 2014 004 713 U1 can be used.

DESCRIPTION OF THE INVENTION

In the following, embodiments of the invention will be described in detail with reference to the drawings in which:

FIG. 1 to FIG. 6 respectively show a partial longitudinal sectional view of a first embodiment of a workpiece clamping system according to the invention in which conveying a lower centering tip into a multi-jaw chuck and clamping the lower centering tip in the multi-jaw chuck are illustrated in different phases of the conveying and clamping process, FIG. 7 to FIG. 12 respectively show a partial longitudinal sectional view of a second embodiment of the workpiece clamping system according to the invention in which a lower centering tip can not only be conveyed vertically along a workpiece rotation axis but also horizontally or transversely relative the workpiece rotation axis, wherein again different phases of the conveying and clamping process of the lower centering tip are illustrated, and FIG. 13 shows a perspective view of a conventional measuring machine comprising a conventional workpiece clamping system on which a workpiece can be clamped between tips or in a multi-jaw chuck.

DETAILED DESCRIPTION OF THE INVENTION

A first embodiment of a workpiece clamping system according to the invention is generally denoted by 10, wherein conveying a lower centering tip 40 into a chuck 11 and clamping the lower centering tip 40 in the chuck 11 are illustrated in various phases of the conveying and clamping process. In this first embodiment the chuck 11 is a multi- or three-jaw chuck provided with an electric rotary drive 12 rotating the three-jaw chuck. The rotary drive 12 comprises a stator 12a and a rotor 12b. Furthermore, the chuck 11 comprises a chuck body 14. The chuck body 14 is not fixedly connected to the rotor 12b on the inside as in a conventional multi-jaw chuck but rotatable relative to the rotor 12b. Jaws 16a, 16b and 16c (the latter is not shown in FIGS. 1 to 6) are guided within the chuck body 14 so as to be radially shiftable for clamping a workpiece (not illustrated) or, as here in the embodiment, a lower centering tip 40 in the chuck 11 or to release it from the chuck 11.

A scroll 18 on which the chuck body 14 is rotatably supported is fixedly connected to the rotor 12b on the inside, or, according to the illustration in FIGS. 1 to 6, integrally formed with the rotor 12b but still rotatable relative to the chuck body 14. The scroll 18 is in a positive engagement with the jaws 16a, 16b and 16c. The clamping jaws 16a, 16b and 16c are radially shifted by a rotation of the scroll 18 relative to the chuck body 14 induced with the aid of the electric rotary drive 12. The rotation of the scroll 18 is not induced manually like with the conventional chuck 11 according to FIG. 13 but motor-driven with the aid of the electric rotary drive 12 which is the rotary drive of a measuring machine, for example, the conventional measuring machine shown in FIG. 13 in the C-axis of which the chuck 11 including a workpiece 12 (not illustrated) is disposed. The measurements on a workpiece and the measurement setup are analogous to those of a conventional measuring machine as shown in FIG. 13. A rotary table 13 of the measuring machine carries a column 19 which in turn carries the chuck 11 on its upper end. The lower centering tip 40 is disposed inside of the column 19 in FIG. 13 and therefore drawn in dotted lines. If a workpiece is to be clamped between the centering tips 30 and 40 the measuring machine according to FIG. 13 first has to be converted by removing the column 19 comprising the chuck 11 as already described in the introduction.

In the clamping system according to the Applicant's abovementioned utility model an outer collar is formed on, i.e. integrally formed with the chuck body 14. On its outer circumference, the outer collar doesn't have a knurling or the like for facilitating a manual operation of the outer collar, but an indentation which is part of a coupling which, like the outer collar in FIGS. 1 to 6 and 7 to 12, is not illustrated. With the aid of this coupling a part of the workpiece clamping system 10 is fixable during a clamping or releasing process so that the electric rotary drive of the measuring machine illustrated by the stator 12a and the rotor 12b here assumes the function of the clamping jaw adjustment. A comprehensive description of the function of the outer ring and the coupling 30 can be found in the Applicant's abovementioned utility model to which reference is made to avoid repetitions. It should only be mentioned here that, with the aid of the coupling, the outer collar and with it the chuck body 14 can be fixed on the stator 12a so that the electric rotary drive 12 assumes the function of the clamping jaw adjustment by rotating the scroll 18 relative to the chuck body 14. Since the chuck body 14 can be mechanically coupled via the coupling comprising the stator 12a the chuck body 14 will not rotate along while the rotor 12b rotates the scroll 18. While the coupling is not activated and the workpiece is clamped by the clamping jaws 16a, 16b and 16c the electric rotary drive 12, as conventionally, serves to rotate the entire chuck 11 including the workpiece clamped therein.

In the illustration of the workpiece clamping system 10 of FIGS. 1 to 6 also a partial sectional view of the scroll 18 is shown in addition to the chuck body 14. The fixed connection of the scroll 18 to the rotor 12b can be established by a positive or bonded connection (both not illustrated in FIGS. 1 to 6).

Figure 5:
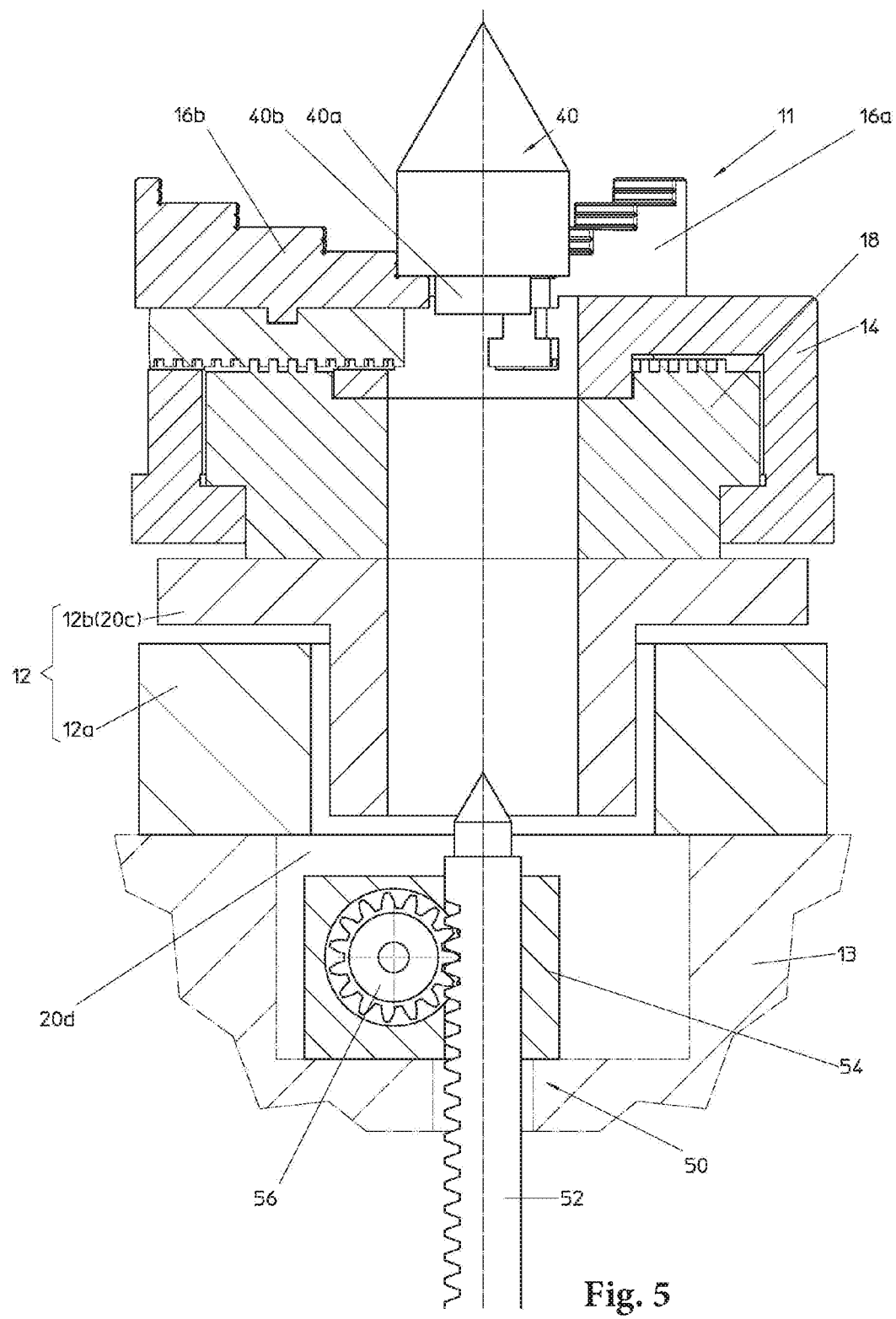
Figure 6:
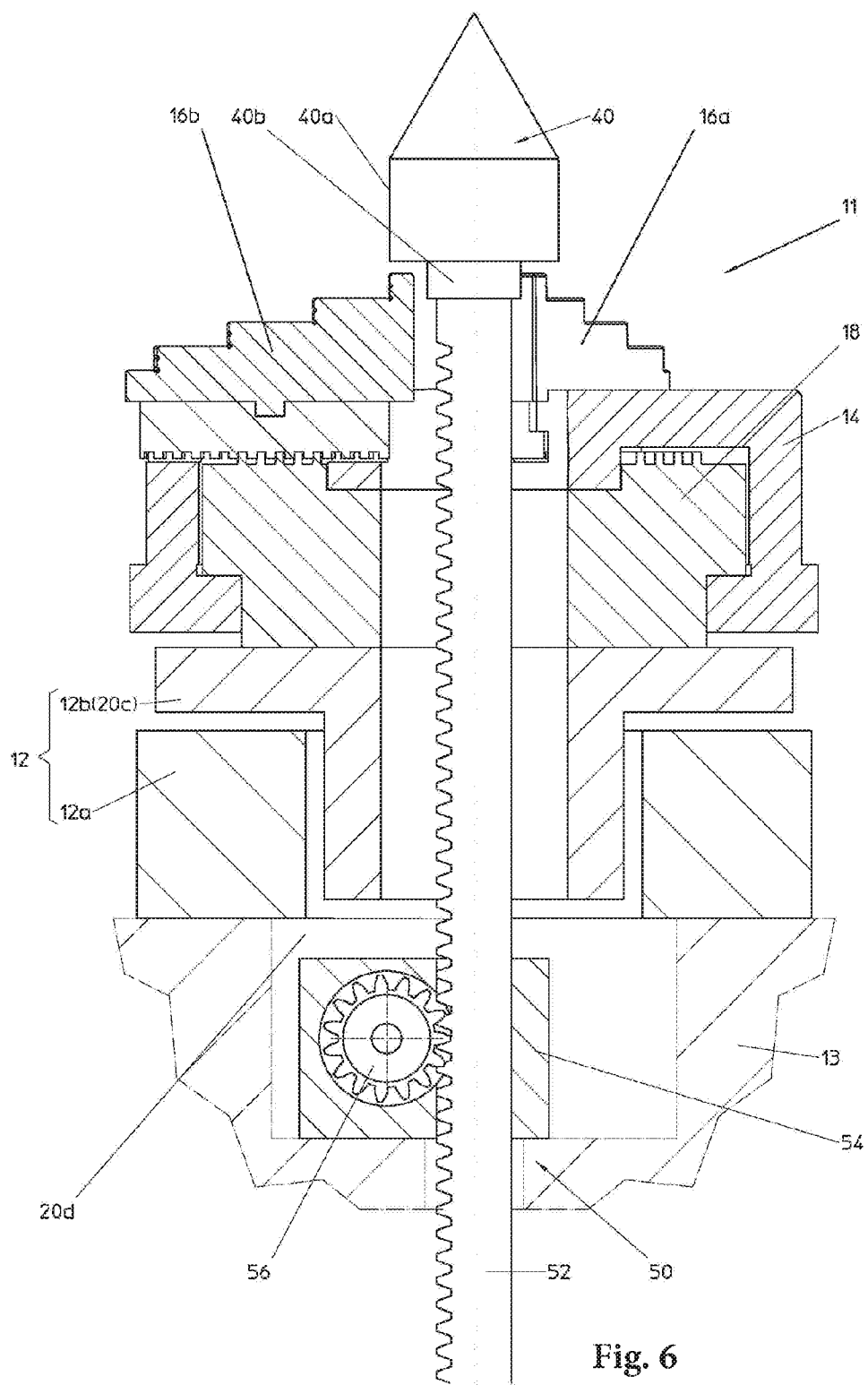

The lower centering tip 40 is provided and formed to be concentrically clamped in the chuck 11 instead of a workpiece. A central bore of the chuck body 14, a central bore the scroll 18, a central bore of the rotor 12b and a central bore of the rotary table 13 are hollow shaft sections 20a, 20b, 20c or 20d which together form a hollow shaft generally designated by 20. The workpiece clamping system 10 serving as a clamping system for the lower centering tip 40 according to the invention is provided with a conveying device for the lower centering tip 40 generally designated by 50. The conveying device 50 serves to vertically convey the lower centering tip 40, i.e. to move it up and down within the hollow shaft 20 into and from its clamping position in the chuck 11. The clamping position of the lower centering tip 40 in the chuck 11 is shown in FIG. 5. The initial or non-operative position of the lower centering tip 40 is shown in FIG. 1. The rod 52 can be reciprocated along the workpiece rotation axis 17 with the aid of an actuator 54. In the embodiment shown, the rod 52 is a rack which can be reciprocated by a pinion 56 drivable by the actuator 54.

Figure 3:
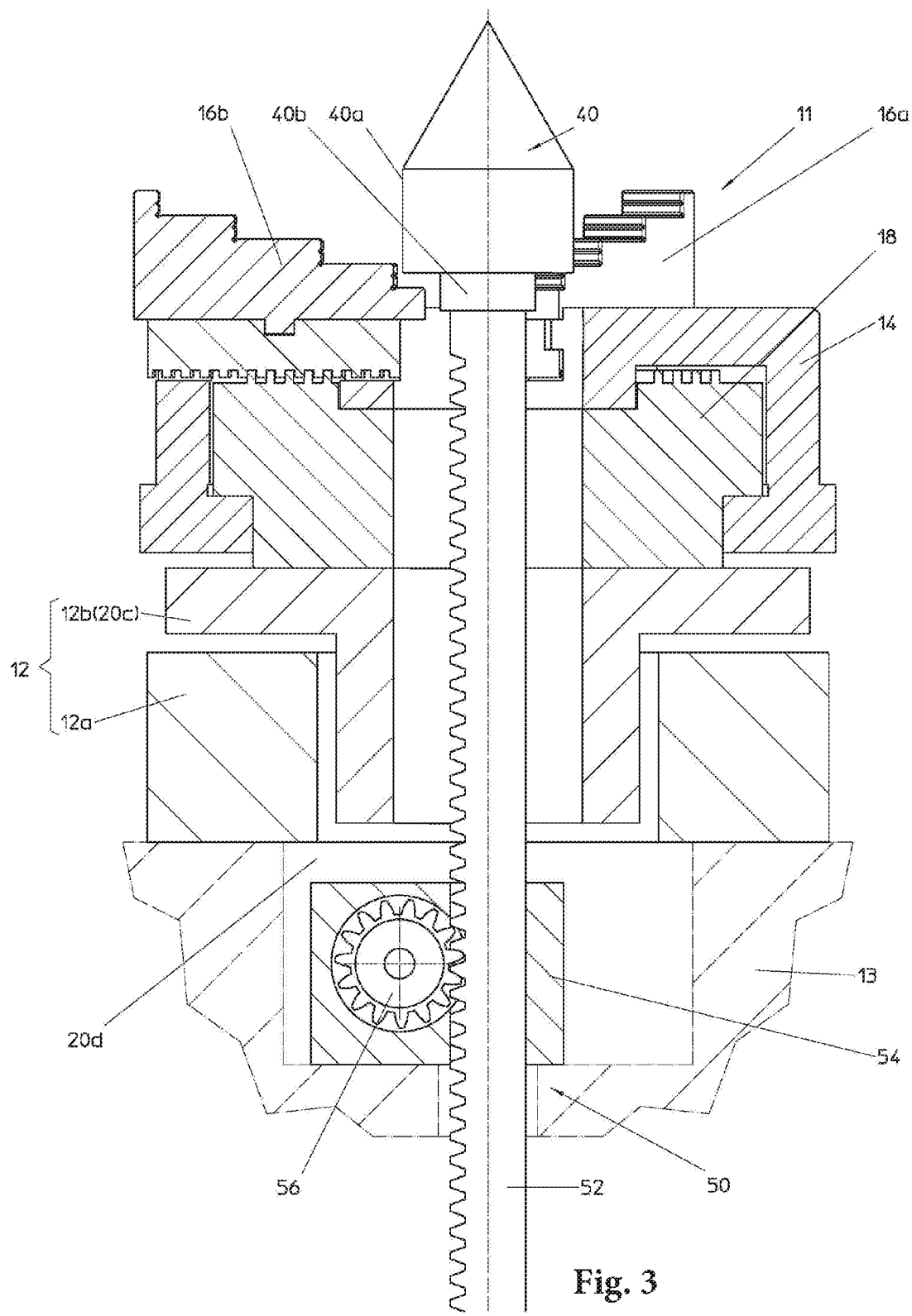
Figure 4:
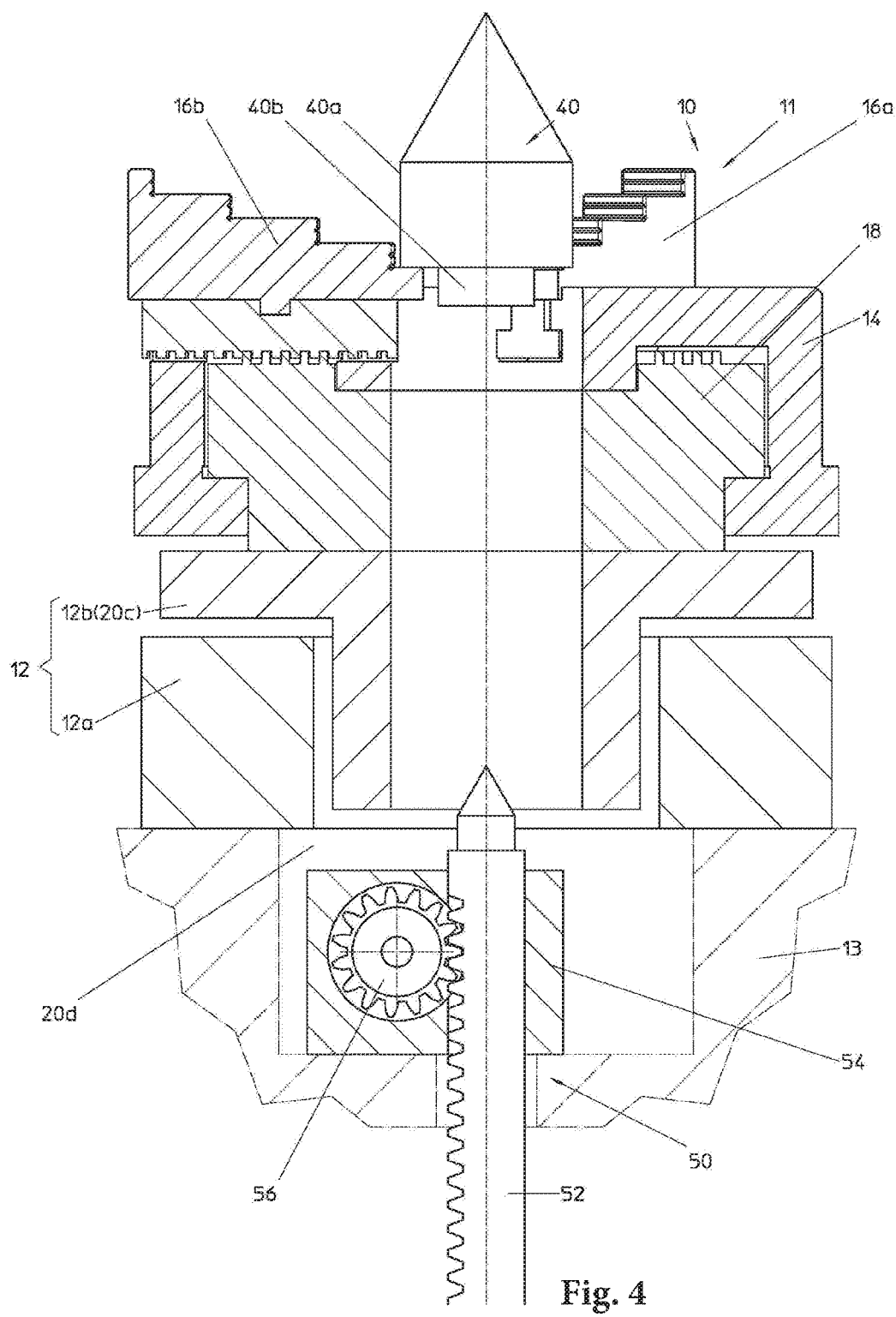

Conveying the lower centering tip 40 into the chuck 11 and clamping the lower centering tip 40 in the chuck 11 are shown in various phases of the conveying and clamping process in FIGS. 1 to 6 to which reference is made again now. If the lower centering tip 40 is in an initial or non-operational position the chuck 11 can be used to clamp a workpiece which is not shown here. In the illustration in FIG. 2 the lower centering tip 40 has been moved upwards into a position in which it can be clamped by the chuck 11 by means of the conveying device 50. FIGS. 3 and 4 show phases of the movement the clamping jaws in the direction of the clamping position, the clamping jaw 16c which is above the plane of projection in the Figures not being shown. In FIGS. 2 to 5 the lower centering tip 40 is clamped in the chuck 11 by the clamping jaws on a lateral surface 40a having a larger diameter of a cylindrical section and on a lateral surface 40b having a smaller diameter of another cylindrical section. It is also possible to only clamp the lower centering tip 40 on the lateral surface 40b of the cylindrical section having a smaller diameter. In any case the rod 52 below the lower centering tip 40 is also clamped by the chuck 11 in the clamping position together with the lower centering tip 40 as shown in FIGS. 2 to 5. When the lower centering tip 40 is in the clamping position according to FIG. 5 a workpiece to be measured is clamped between the lower centering tip 40 and the upper centering tip 30. For this clamping process, the upper centering tip 30 (FIG. 13) is vertically shiftable. The clamping of the lower centering tip 40 in the chuck 11 is performed by radially shifting the clamping jaws 16a, 16b and 16c. This radial shift of the clamping jaws can be accomplished like in the clamping system according to the Applicant's aforementioned utility model, or manually, or by a separate drive (not shown) which is independent of the rotary drive of the chuck 11.

FIGS. 7 to 12 show a second embodiment of the workpiece clamping system 10 according to the invention in which a lower centering tip 40 is not only vertically conveyable along the workpiece rotation axis 17 but also transversely relative to the workpiece rotation axis 17, wherein in turn various phases of the conveying and clamping process of the lower centering tip 40 are illustrated. The difference between the first embodiment according to FIGS. 1 to 6 and the second embodiment according to FIGS. 7 to 12 resides in that the conveying device 50 conveying the lower centering tip 40 only vertically is replaced by a conveying device 50' which conveys the lower centering tip both vertically and horizontally, i.e. transversely relative to the workpiece rotation axis 17 and along the workpiece rotation axis 17. To this end, the conveying device 50' comprises horizontally shiftable conveying equipment 58. The conveying equipment 58 comprises a pliers-like claw 59 gripping and clamping the lower centering tip 40 at the lateral surface 40a. The conveying device 50' may be a robot as typically used in assembly lines, for example, in automobile industry.

Figure 7:
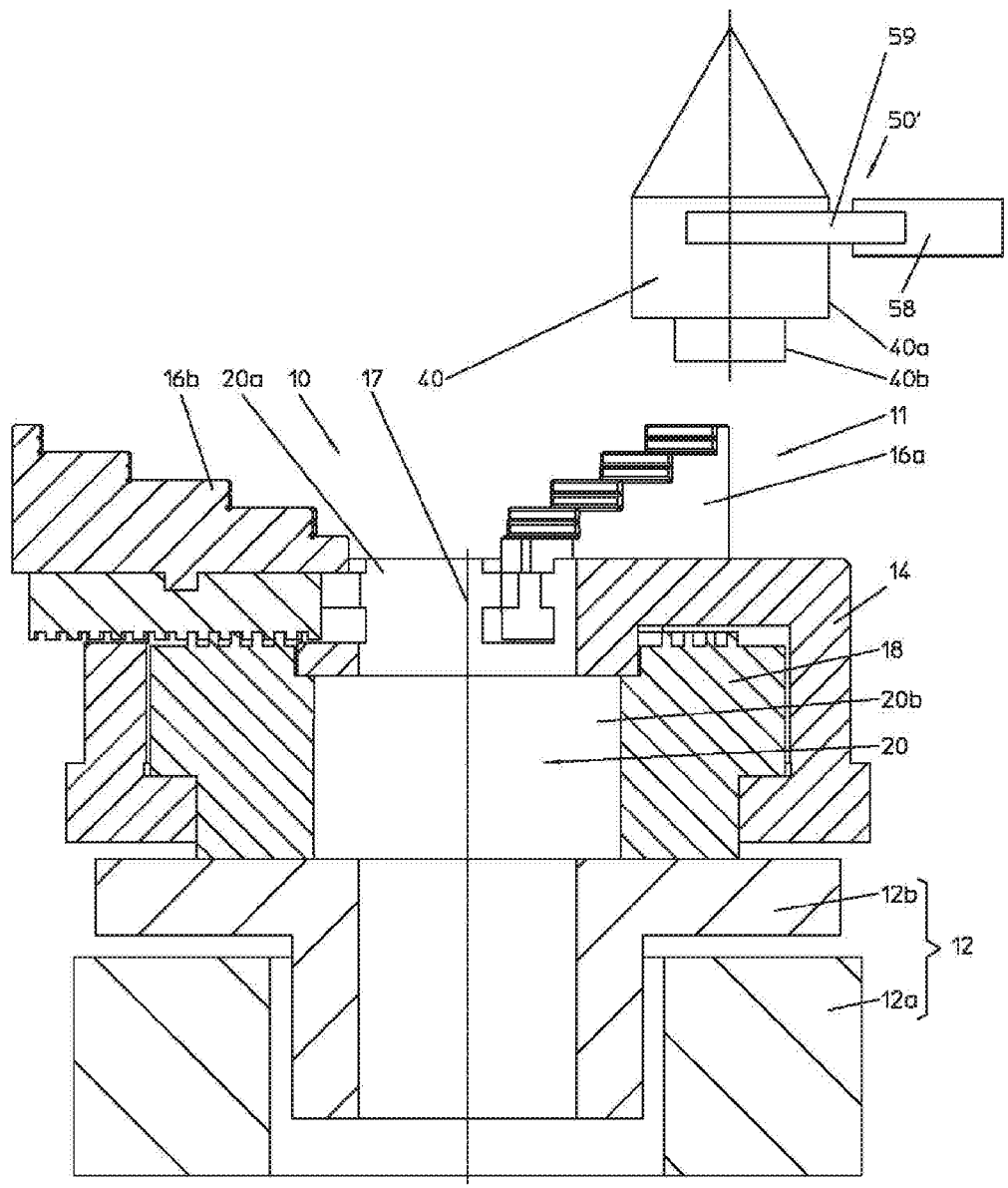
Figure 8:
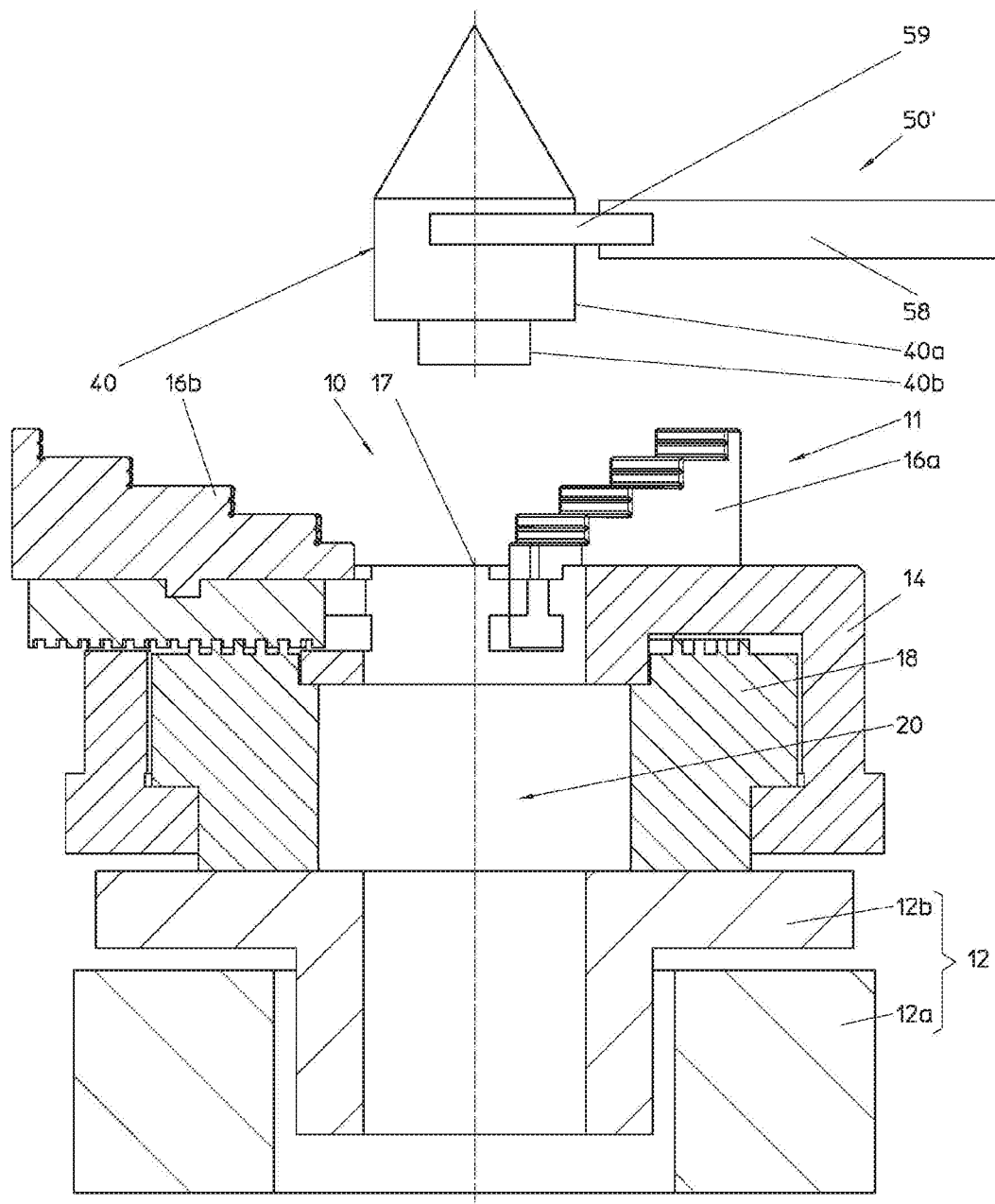
Figure 9:
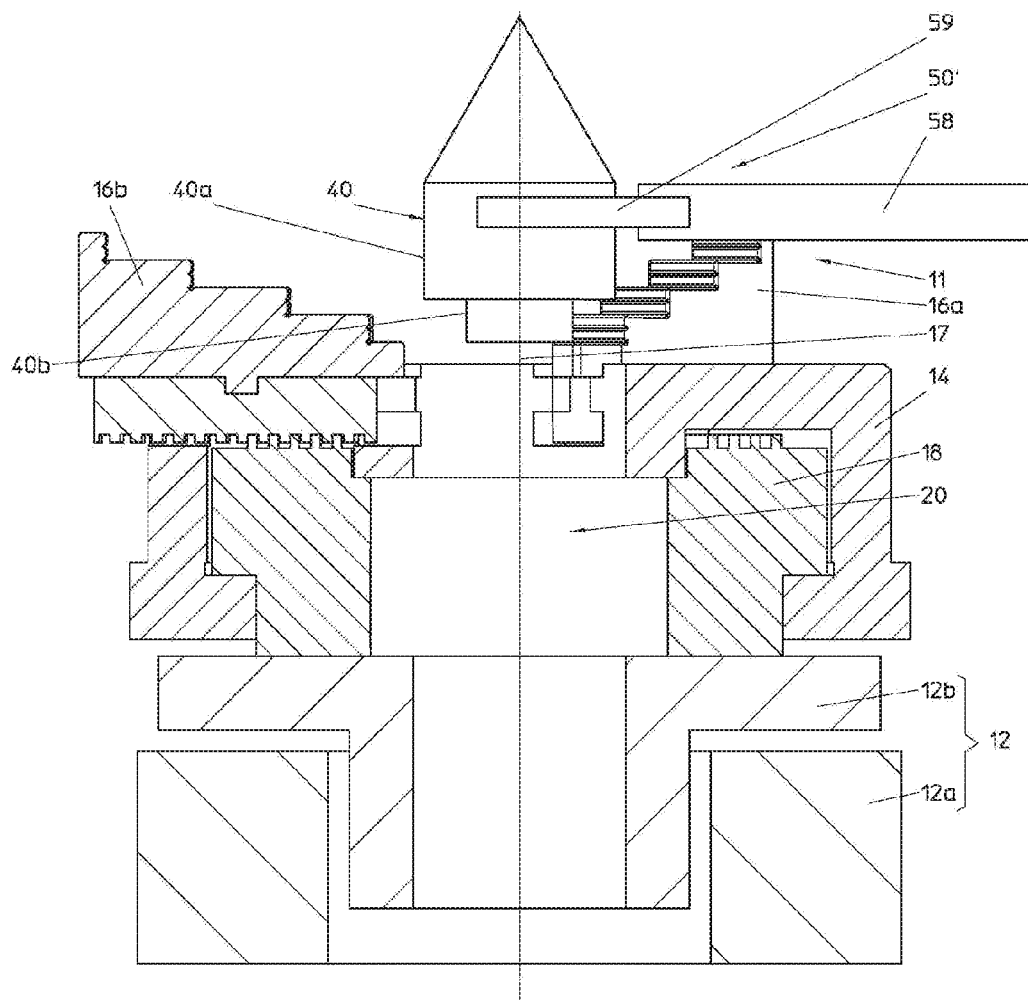
Figure 10:
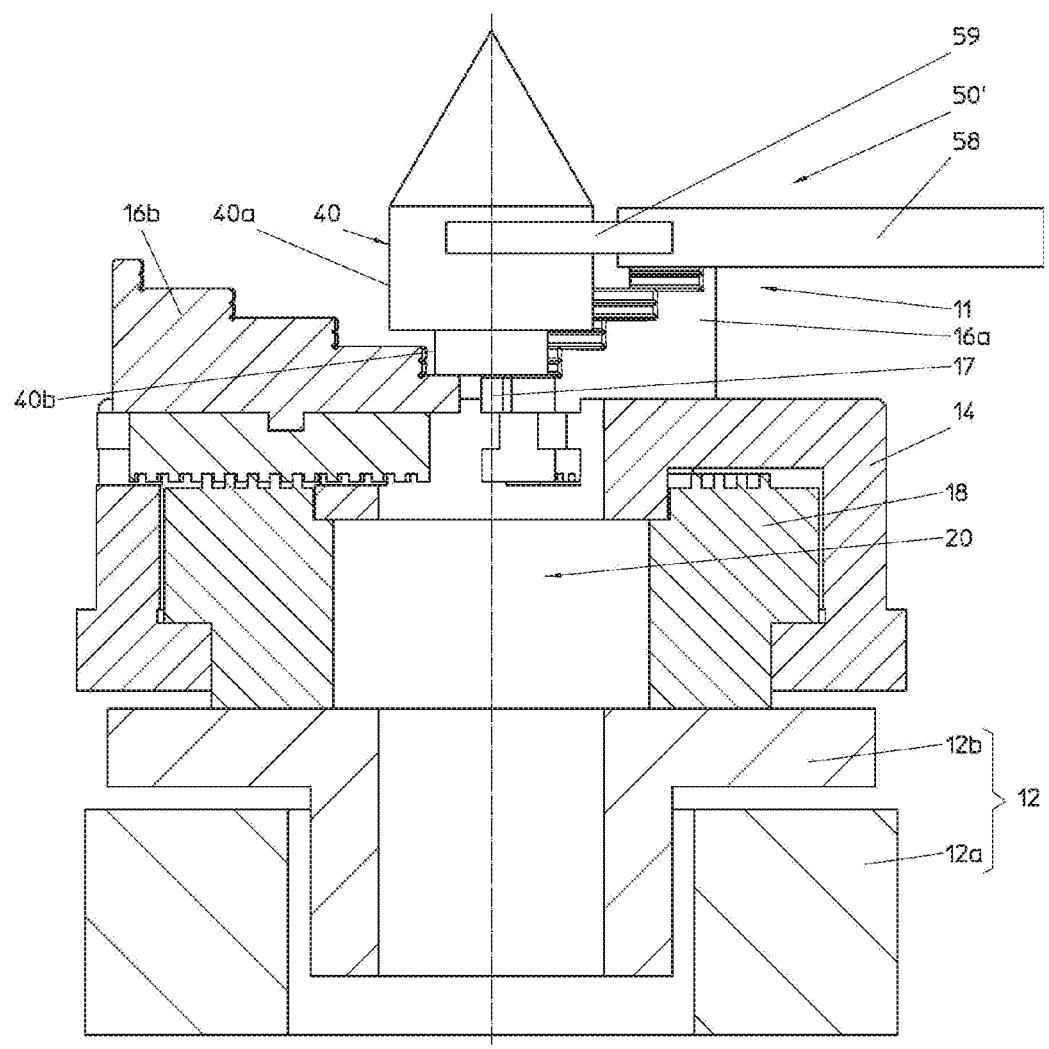
Figure 11:
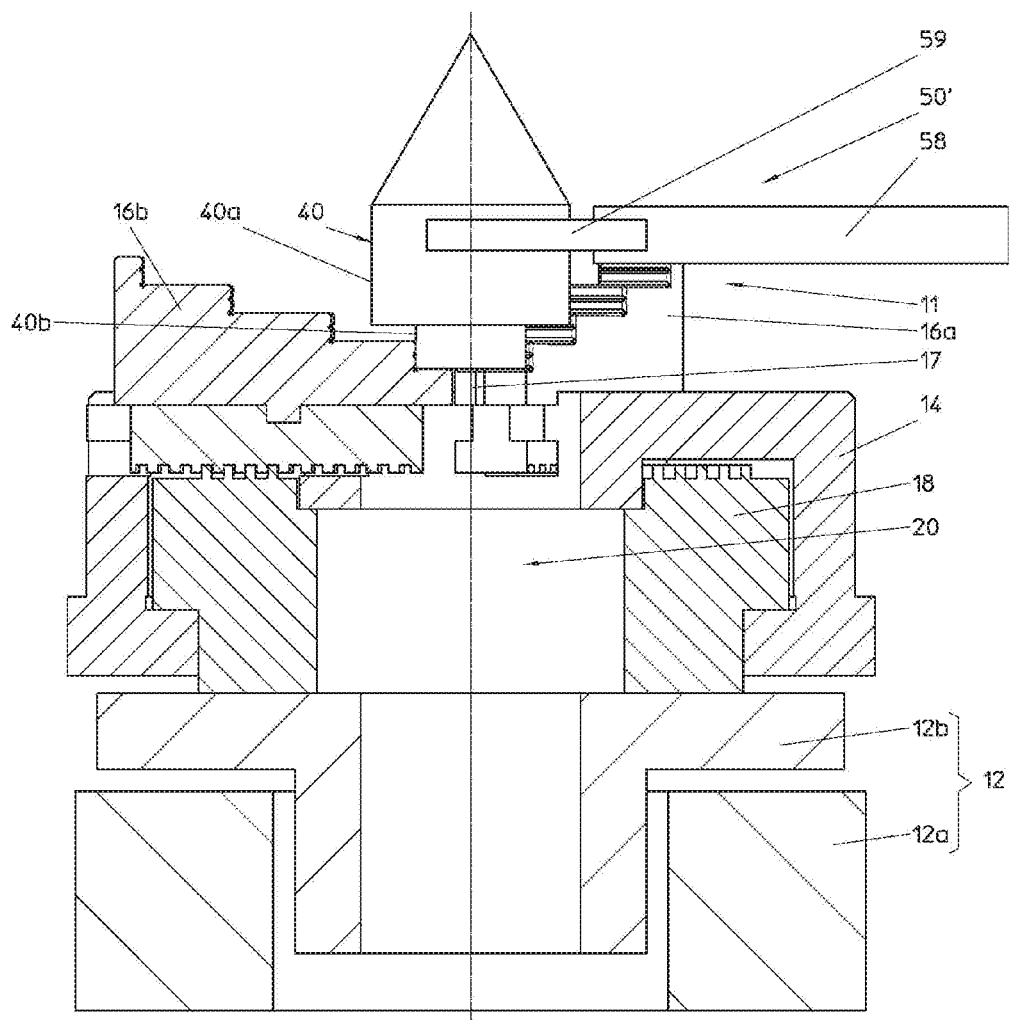
Figure 12:
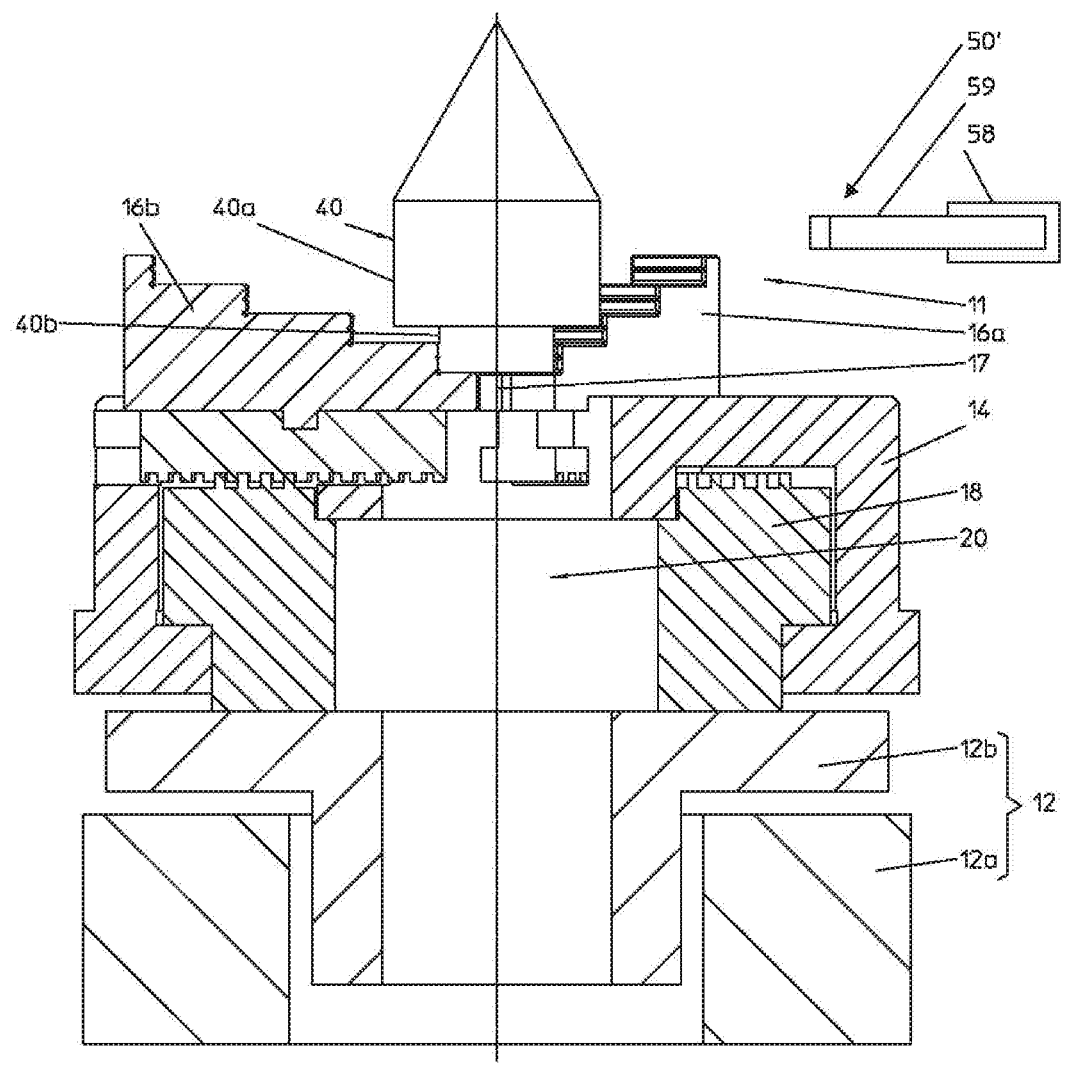

FIG. 7 shows the conveying device 50' in a phase in which it has already moved the lower centering tip 40, particularly horizontally, into a position above the chuck 11. In FIG. 8, the conveying device 50' has moved the lower centering tip 40 further, horizontally, into a position in which a central axis of the lower centering tip 40 is located in the workpiece rotation axis 17. In FIG. 9, the positioning device 50' has moved the lower centering tip 40 vertically downwards into a position between the clamping jaws 16a-16c. In FIG. 10, the clamping jaws 16a-16c are already almost closed around the lateral surfaces 40a and 40b of the lower centering tip 40. In FIG. 11, the claw 59 does no longer retain the lower centering tip 40 but already begins to open to release the lower centering tip 40 in its clamping position in the chuck 11. In FIG. 12, the conveying device 50' has already moved the conveying equipment 58 and the claw 59 away from the lower centering tip 40. The lower centering tip 40 is now operational.

The release of the lower centering tip 40 from the chuck 11 would be performed in the reverse order. That means that the claw 59 would be returned from position shown in FIG. 12 to the position according to FIG. 11 and clamp the lower centering tip 40 in the position according to FIG. 10. Then the chuck 11 would be opened in the Position according to FIG. 9 while the lower centering tip 40 would be retained in its position by the conveying device 50'. Finally. the conveying device 50' would lift the lower centering tip 40 vertically upwards into the workpiece rotation axis 17 to convey it into the position according to FIG. 8, and eventually into the position according to FIG. 7.

A hollow shaft also exists in the embodiment according to the FIGS. 7 to 12, however, it is not required there.

LIST OF NUMERALS

10 workpiece clamping system
11 chuck
11' chuck
12 rotary drive
12*a* stator
12*b* rotor
13 rotary table
14 chuck body
16*a* clamping jaw
16*b* clamping jaw
16*c* clamping jaw
17 workpiece rotation axis
18 scroll
19 column
20 hollow shaft
20*a* hollow shaft section
20*b* hollow shaft section
20*c* hollow shaft section
20*d* hollow shaft section
30 upper centering tip
40 lower centering tip
40' lower centering tip
40*a* lateral surface
40*b* lateral surface
50 conveying device (vertically)
50' conveying device (vertically and horizontal)
52 rod
54 actuator
56 pinion
58 conveying equipment
59 claw

What is claimed is:

1. A workpiece clamping system for a measuring machine, the workpiece clamping system comprising:
    a rotary table
        disposed in a workpiece rotation axis and
        comprising a chuck to accommodate a workpiece concentrically;
    a rotary drive for driving the rotary table;
    an upper centering tip mounted on the measuring machine in the workpiece rotation axis and mounted vertically opposed to the rotary table;
    a lower centering tip mounted on the rotary table in addition to the chuck for accommodating a workpiece between the upper centering tip and the lower centering tip instead of in the chuck, the lower centering tip concentrically clamped in the chuck instead of the workpiece; and
    a conveying device for conveying the lower centering tip into and from a clamping position in the chuck;
    wherein the conveying device comprises conveying equipment for conveying the lower centering tip transversely relative to the workpiece rotation axis and along the workpiece rotation axis.

2. The workpiece clamping system according to claim 1, further comprising a hollow shaft;
    wherein the rotary table or the rotary drive comprises at least one segment of the hollow shaft for receiving the lower centering tip and vertically conveying the lower centering tip along the workpiece rotation axis by the conveying device.

3. The workpiece clamping system according to claim 2, further comprising a rod disposed in the hollow shaft;
    wherein the conveying device moves the rod inside the hollow shaft between a non-operating position and a clamping position of the lower centering tip.

4. The workpiece clamping system according to claim 3, further comprising an actuator for reciprocating the rod along the workpiece rotation axis.

5. The workpiece clamping system according to claim 3, further comprising an actuator and a pinion, the actuator for driving the pinion;
    wherein the rod is a rack;
    wherein the pinion reciprocates the rack along the workpiece rotation axis.

6. The workpiece clamping system according to claim 1, wherein the chuck is a multi-jaw chuck.

7. The workpiece clamping system of claim 1, wherein the conveying device conveys the lower centering tip vertically or vertically and horizontally.

8. A workpiece clamping system for a measuring machine, the workpiece clamping system comprising:
    a rotary table disposed about a workpiece rotation axis;
    a chuck associated with the rotary table, the chuck for receiving a workpiece concentrically;
    a rotary drive for driving the rotary table;
    an upper centering tip mounted on the measuring machine in the workpiece rotation axis and mounted vertically opposed to the rotary table;
    a lower centering tip mounted on the rotary table in addition to the chuck for accommodating a workpiece between the upper centering tip and the lower centering tip, the lower centering tip concentrically clamped in the chuck instead of the workpiece; and
    a conveying device for conveying the lower centering tip into and from a clamping position in the chuck;
    wherein the workpiece is not held in in the chuck;
    wherein the conveying device comprises conveying equipment for conveying the lower centering tip transversely relative to the workpiece rotation axis and along the workpiece rotation axis.

* * * * *